J. J. S. GALLIMORE.
TOOL FOR BORING POLYGONAL HOLES.
APPLICATION FILED MAY 21, 1917.

1,270,144.

Patented June 18, 1918.

Witness
Chas. W. Stauffiger
Arthur F. Draper

Inventor
James J. S. Gallimore
By
Barthel Barthel
Attorneys

UNITED STATES PATENT OFFICE.

JAMES J. S. GALLIMORE, OF DETROIT, MICHIGAN.

TOOL FOR BORING POLYGONAL HOLES.

1,270,144.  Specification of Letters Patent.  Patented June 18, 1918.

Application filed May 21, 1917. Serial No. 169,863.

*To all whom it may concern:*

Be it known that I, JAMES J. S. GALLIMORE, a subject of the King of Great Britain, residing at Detroit, in the county of Wayne and State of Michigan, have invented certain new and useful Improvements in Tools for Boring Polygonal Holes, of which the following is a specification, reference being had therein to the accompanying drawings.

This invention relates to a device for boring polygonal holes and more particularly to a tool for such purpose which may be mounted in a drill press, or other machine for rotating the tool or may be manually operated in the manner of any ordinary boring tool.

The object of the invention is to provide a very simple and efficient tool for the purpose which may be cheaply manufactured and is adapted for use in connection with any machine or device adapted for holding or operating boring tools, and the invention consists in the form and construction of such a tool and in the matters hereinafter more fully set forth, reference being had to the accompanying drawing in which—

Figure 2:
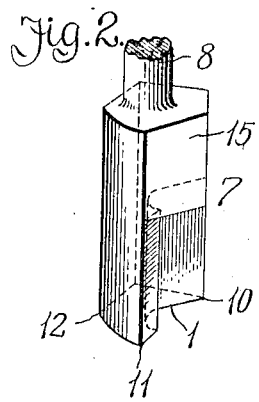
Fig. 2 is a perspective view of the tool detached.
Figure 1:
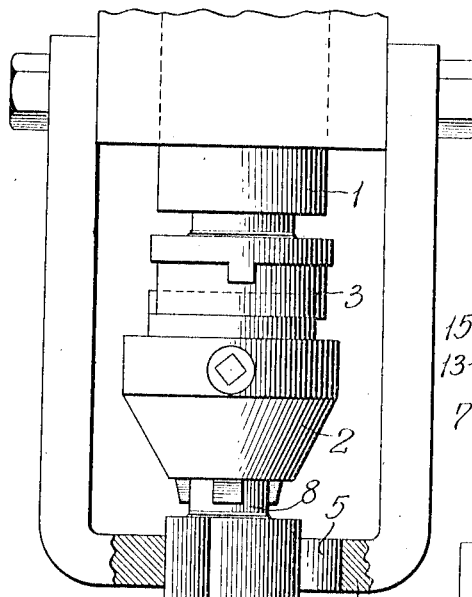
Figure 1, is a side elevation of a tool illustrative of the invention with a portion of the same broken away to better show the construction, and also showing the same in operative position and held by suitable rotating and guiding means.

For the purposes of illustration, a particular form of tool is shown, but obviously changes may be made therein within the scope of the appended claims, without departing from the spirit of the invention and I do not therefore wish to limit myself to the particular construction shown.

In the drawing, 1 denotes the spindle of a suitable drill press or other machine adapted to hold and drive a boring tool, 2 a chuck for grasping the shank of a tool, and 3 a suitable coupling which will permit of a lateral movement of the chuck and tool relative to the driving spindle during rotation. 4 is a suitable guide or former plate which is rigidly supported in any suitable manner with an opening 5 therein in axial alinement with the driving spindle, said opening being of the size and form which it is desired to bore in the work 6 and through which opening 5 the tool 7 extends and is guided thereby. The tool is revolved in contact with the walls of this opening in the former plate but it will be understood that this plate may be dispensed with by first forming a hole in the work of the same form and size as the hole to be bored and of sufficient depth so that the walls thereof will form a guide for the tool.

The tool comprises a body portion and a reduced end portion, forming a shank 8 by means of which it may be secured in a chuck 2 or other holding device and rotated. The tool is so shaped that when rotated within a suitably shaped guide opening of polygonal form having diametrically disposed angles, and opposed parallel flat sides or walls, the resistance offered by the material being bored to the movement of the cutting edge 9 formed on the lower end of the tool, will force said tool toward one side of the guide opening and cause it to follow the contour thereof throughout rotation, and to cause the tool to cut true to the straight walls of the former opening or guide and into the angles formed by the juncture of said walls, it is imperative that the tool have a minimum of lateral play in the former or hole in the direction of the length of the cutting edge, in all positions of its turning movement, that is, the dimensions of the tool should be such that the side thereof at which the cutting edge is located will be held in contact with the walls of the guide in all positions of the tool, by the contact of the opposite side of the tool with the guide walls. To prevent such lateral movement, the tool should have three points of contact with the guide or former, one substantially in the plane of the outer end of the cutting edge of the tool or at the angle 10 and the other two at the angles 11 and 12 at the opposite side of the tool. If imaginary lines, as the dotted lines 13, be drawn connecting these points, a triangular shaped figure is described, the sides of which cannot be greater in length than the short diameter of the guide or former opening, as otherwise the tool could not be rotated. The maximum width of the base of this triangle is determined by striking an arc of a circle from the point where the diametrical line of the polygon intersects one side thereof, tangent with the opposite parallel side and noting where this arc intersects the adjacent sides of the polygon. This will give the maximum length of the base line of the triangle, or a triangular shaped figure of maximum dimensions which will turn within the polygonal opening, and by giving said base line of the triangle a curve corresponding to said arc, the tool, in turning in contact with the walls of the polygonal opening, will rock thereon and cause the point or apex of the triangle to describe a straight line corresponding to a straight side or flat of the polygon.

The longitudinal axis of the tool will describe a path about the center of the polygonal hole being bored and therefore in order that the material may all be cut away, at the bottom of the hole, the cutting edge 9 of the tool is formed on the lower end thereof along a line extending approximately from the point or angle 10 to or beyond the said axis of the tool, the body of the tool being cut away at its forward or advance side for a distance upwardly from said cutting edge to give clearance for the chips cut from the work in boring.

Figure 4:
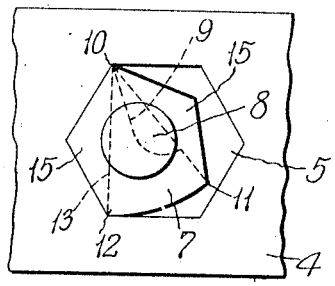
Fig. 4 is an end elevation of the tool, and showing in plan view a form of guide plate therefor.

For the purpose of strength, the rear side of the tool opposite that which is cut away to form the cutting edge, may be given an angular form, as at 14, corresponding to the adjacent faces of the opening, that is the space between one side of the necessary triangle shaped figure, the sides of which are described by the dotted line 13, and the adjacent walls of the hole being bored when the tool is in the position shown in Fig. 4, may be filled in, and in a like manner, when the former plate 4 is employed, that portion of the body which rotates within the opening of the plate may be formed, for the purposes of strength and symmetry, with an angular portion at each side of the triangular portion as shown at 15 in Fig. 4, identical in shape with that of the portion 14, making, in cross section, a five sided figure.

Figure 8:
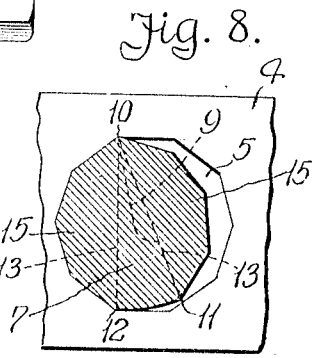
Fig. 8 is a sectional view of the same, similar to Fig. 6.
Figure 5:
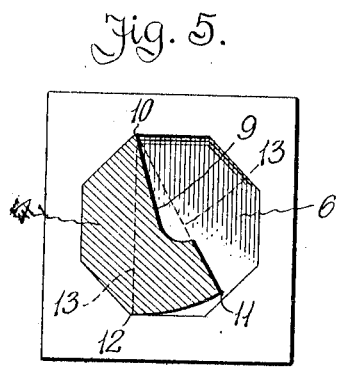
Fig. 5 is a view similar to Fig. 3, illustrating a modified form of tool for boring octagonal holes.
Figure 7:
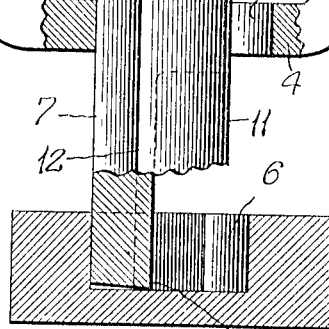
Fig. 7 is a view similar to Fig. 5 showing a modified form of tool for boring decagonal holes.
Figure 6:
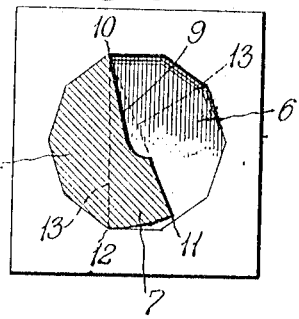
Fig. 6 is a transverse section through that portion thereof which is adapted to engage the former plate.
Figure 6:
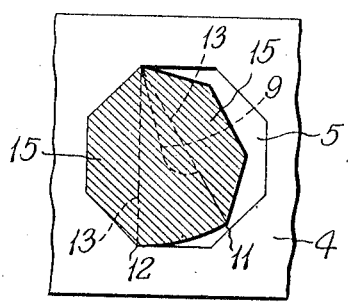
Figure 3:
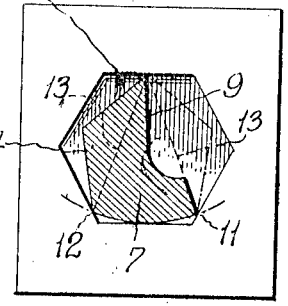
Fig. 3 is a transverse section of the tool on a plane adjacent to and above the work, with the work in plan view.

In Figs. 5 and 6, a tool for boring octagonal holes is illustrated, but the foregoing description of the construction and operation of the tool for boring hexagonal holes shown in Figs. 3 and 4 will apply as well to the tool illustrated in these figures, or to any tool for boring even sided polygonal holes, such as is further illustrated in Figs. 7 and 8, where a tool for boring decagonal holes is shown.

Having thus fully described my invention what I claim is:

1. A tool for boring polygonal holes including a guide having a polygonal opening, a part adapted to be rotated within said polygonal opening and to simultaneously contact the walls thereof at three points, one of said points of contact being equi-distant from the other two and at a distance from each substantially equal to the shortest diameter of said polygonal opening, and said other two points being a greater distance apart than the distance between adjacent angles of the polygonal opening, said rotatable part having a cutting edge on its lower end.

2. A tool for boring polygonal holes including a guide having a polygonal opening, a part adapted to contact the walls of said polygonal opening at points defining the three angles of an isosceles triangular figure with the side of said figure which is of lesser length, of greater length than the distance between adjacent angles of the polygonal opening, said part being provided with a cutting edge at the lower end thereof.

3. A tool for boring polygonal holes including a guide having a polygonal opening, a part adapted to contact the walls of said polygonal opening at points defining the three angles of a triangular figure the two sides of which figure are substantially equal in length to the shortest diameter of said polygonal opening, and the base line of which triangular figure is greater in length than any one side of said polygonal opening, said part being provided with a cutting portion at its lower end.

4. A tool for boring polygonal holes including a guide having a polygonal opening, a part adapted to contact the walls of said polygonal opening at points defining the three angles of a triangular figure with a side of said part forming the base line of said figure and defining the arc of a circle whose center is at the apex of said triangular figure, and the radius of which circle is substantially equal to the shortest diameter of said polygonal opening.

5. A tool for boring polygonal holes including a guide having a polygonal opening a part adapted to contact the walls of said polygonal opening at points defining the three angles of a triangular figure, the base line of which is the arc of a circle whose center is at the apex of said triangular figure, and the length of which arc is defined by the intersection of said arc with the two adjacent walls of the polygonal opening when said arc is struck tangent with one wall of said polygonal opening, said part having an end cutting portion.

6. A tool for boring polygonal holes including a guide having a polygonal opening, a part adapted to contact the walls of said polygonal opening at points defining the three angles of a triangular figure, said tool having a cutting edge formed on its lower end extending substantially radially of said end from one of said points of contact to a point beyond the longitudinal axis of the tool, whereby said cutting edge will cut away the material at the center of the hole to be bored.

7. A tool for boring polygonal holes including a guide having a polygonal opening, a part adapted to contact the walls of said polygonal opening at points defining the three angles of a triangular figure, said tool being cut away at one side at its lower end inwardly from one of said contact points substantially toward the axis of rotation of said part, to provide clearance and a cutting edge.

In testimony whereof I affix my signature in the presence of two witnesses.

JAMES J. S. GALLIMORE.

Witnesses:
ANNA M. DORR,
G. E. McGRANN.